United States Patent
Schmidt (10) Patent No.: US 7,929,323 B2
(45) Date of Patent: Apr. 19, 2011

(54) METHOD AND APPARATUS FOR PRE-CHARGING POWER CONVERTERS AND DIAGNOSING PRE-CHARGE FAULTS

(75) Inventor: Robert H. Schmidt, Germantown, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 292 days.

(21) Appl. No.: 12/239,432

(22) Filed: Sep. 26, 2008

(65) Prior Publication Data

US 2010/0080022 A1    Apr. 1, 2010

(51) Int. Cl.
*H02H 7/125* (2006.01)
*H02M 5/42* (2006.01)

(52) U.S. Cl. ........... 363/52; 363/53; 363/81; 363/84; 363/125; 363/126

(58) Field of Classification Search ............ 363/52, 363/53, 81, 84, 125, 126
See application file for complete search history.

(56) References Cited

U.S. PATENT DOCUMENTS

| | | | | |
|---|---|---|---|---|
| 5,715,154 A | * | 2/1998 | Rault | 363/89 |
| 6,157,097 A | * | 12/2000 | Hirose et al. | 307/125 |
| 6,646,842 B2 | * | 11/2003 | Pan et al. | 361/58 |
| 7,233,465 B2 | * | 6/2007 | Lee | 361/42 |
| 7,505,291 B2 | * | 3/2009 | Wang et al. | 363/89 |
| 2002/0191426 A1 | * | 12/2002 | Hussein et al. | 363/50 |
| 2003/0035311 A1 | * | 2/2003 | Phadke | 363/89 |

* cited by examiner

*Primary Examiner* — Bao Q Vu (74) *Attorney, Agent, or Firm* — Fay Sharpe LLP; R. Scott Speroff; John M. Miller (57) ABSTRACT

Power conversion systems and diagnostic techniques are presented for detecting suspected converter faults when a pre-charge circuit is engaged during system startup, in which known or estimated system characteristics are used to derive expected converter voltage values or rate of change values and the levels are measured during startup to ascertain whether the pre-charge circuit or other converter components are faulted.

22 Claims, 7 Drawing Sheets

METHOD AND APPARATUS FOR PRE-CHARGING POWER CONVERTERS AND DIAGNOSING PRE-CHARGE FAULTS

FIELD OF THE INVENTION

The present invention relates generally to electrical power conversion systems and more particularly to pre-charge operation and pre-charge fault diagnosis in motor drives and other power conversion systems.

BACKGROUND OF THE INVENTION

Power conversion systems are used in a variety of applications in which electrical power must be converted from one form to another, such as supplying power to a grid, driving electric motors, etc. AC to DC converters are often employed for driving inverter type AC motor drives, with the front-end converter rectifying AC power from a utility or other supply to provide a DC bus to one or more inverters for driving AC motors or other loads. In many such rectifier systems, a pre-charge system is provided to control the DC bus voltage rise time so as to limit the inrush current into capacitive loads during power-up and to mitigate or avoid stressing system components. These objectives are hindered if the pre-charge system itself is damaged or inoperative. In addition, certain pre-charge circuit failure modes may adversely affect the steady state operation of the power converter. Troubleshooting the system using an oscilloscope or other external measuring devices via trial and error methods typically requires repeated power cycles of the AC line and often leads to additional stress on DC bus capacitors and other system components. The increased component stress during troubleshooting may result in other failures in the system and reduced component life. Accordingly, there is a need for techniques by which pre-charge problems can be diagnosed in AC to DC converters while mitigating the system downtime and component degradation.

SUMMARY OF INVENTION

Various aspects of the present invention are now summarized to facilitate a basic understanding of the invention, wherein this summary is not an extensive overview of the invention, and is intended neither to identify certain elements of the invention, nor to delineate the scope thereof. Rather, the primary purpose of this summary is to present some concepts of the invention in a simplified form prior to the more detailed description that is presented hereinafter. The present disclosure involves diagnosing faults in pre-charge circuit or elsewhere in a power conversion system during converter startup, by which the above mentioned shortcomings of conventional systems and techniques can be mitigated or avoided. In the embodiments disclosed below, specific diagnostic determinations can be made by the converter to identify potential faults in a pre-charge circuit switching device, whether relay, IGBT, etc., faults in the pre-charge circuit resistance (e.g., shorted or opened), misapplication of the output bus (e.g., too much or too little load capacitance), and/or short-circuited bus conditions based on measured characteristics of a measured bus voltage during the initial startup of the converter. In this manner, the potential faults are identified automatically and without the need for excessive power-cycling and extensive trouble shooting as was required in the past. Moreover, the expedited fault diagnosis advantageously mitigates or avoids excessive component stress and thereby enhances the system reliability and extends MTBF parameters.

In accordance with one or more aspects of the disclosure, a power converter is provided that includes an input to receive AC electrical input power and an output to provide DC electrical output power, such as for driving one or more motor drive inverters or other DC load, with a rectifier coupling the input and output to convert the input AC to output DC power, where the rectifier may be a passive diode bridge or may be a switching rectifier. The converter includes a pre-charge circuit with a resistor coupled between the rectifier and the output, and one or more switching devices such as relays, semiconductor-based switches, etc., that is selectively opened to conduct the startup current through the resistor for limiting inrush current to the DC bus, and which then closes during normal operation. A feedback system is provided to measure the converter DC voltage and to provide a corresponding feedback signal, and a controller is employed to control the operating state of the pre-charge circuit.

The converter also includes a pre-charge diagnosis system that detects converter faults according to the feedback signal during startup and selectively shuts the system down based on detected faults. In various exemplary embodiments, the pre-charge diagnosis system performs a separate fault detection operation in each of a plurality of diagnostic states during the system startup, and may computes a dv/dt rate of change in the DC voltage in the diagnostic states and selectively detects faults based at least partially on the computed dv/dt values. In accordance with other aspects of the disclosure, the diagnosis system measures the initial DC voltage before power is applied to the input, and computes an expected range of DC voltages or DC voltage change rates over time during startup using the initial DC voltage Vpp and known or assumed values for output capacitance coupled to the output, and the pre-charge circuit resistor. The diagnosis system then measures the DC voltage after power is applied, and selectively detects converter faults based on the feedback signal and the expected range of DC voltages or DC voltage change rates.

Thus, the system accommodates powerup situations in which the internal bus voltage is non-zero when external input power is applied, and determines an acceptable range of bus voltage or dv/dt values over time using known/expected information about the load capacitance and the pre-charge resistance. The diagnosis system in certain embodiments, moreover, may perform learning in which a previously computed expected range of DC voltages or DC voltage change rates is used. Subsequent comparisons of the actual measured voltage or dv/dt with the expected ranges can be used to infer whether a fault is suspected, and if so, the most likely cause of the fault, such as a fault in the pre-charge circuit, a downstream short circuit in a DC bus connected to the output, or incorrect capacitance load connected to the output.

Certain embodiments include an interface, with the diagnosis system providing a fault indicator to indicate a diagnosed fault type, such as specific problems in the pre-charge circuit or elsewhere in the converter. This facilitates prompt repair or replacement of the diagnosed fault without the need for lengthy troubleshooting using oscilloscopes or other external diagnostic equipment, and also reduces the potential for further component degradation associated with power cycles associated with such troubleshooting.

In accordance with further aspects of the disclosure, a method is provided for detecting power converter faults during startup. The method includes activating a pre-charge circuit connected to the output of a rectifier, measuring an initial converter DC voltage, and determining an expected range of DC voltages or DC voltage change rates based at least partially on the initial converter DC voltage. The method further includes applying AC electrical input power to the rectifier, again measuring the converter DC voltage after application of the input power during startup of the converter, and determining whether a fault is suspected in the converter during startup based at least partially on the measured DC voltage. In certain implementations, if a fault is suspected, the application of input power is discontinued and the converter is placed in a fault state, with the diagnosed fault type being indicated via an interface. The method may also include performing a separate fault detection operation in each of a plurality of diagnostic states during startup, as well as computing dv/dt rates of voltage change and detecting faults based on the computed dv/dt values. This may be done, in certain embodiments, by computation of an expected range of DC voltages or DC voltage change rates over time during startup using the initial DC voltage and known or assumed values for an output capacitance coupled to the converter, and a resistance of the pre-charge circuit, and determining whether a fault is suspected based at least partially on the measured DC voltage and the expected range of DC voltages or DC voltage change rates.

Other aspects of the disclosure provide a computer readable medium having computer executable instructions for activating a pre-charge circuit connected to an output of a rectifier, measuring an initial converter DC voltage, determining an expected range of DC voltages or DC voltage change rates based at least partially on the initial converter DC voltage, measuring the converter DC voltage after application of the input power during startup of the converter, and determining whether a fault is suspected in the converter during startup based at least partially on the measured DC voltage.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the invention will be set forth in the following detailed description when considered in conjunction with the drawings, in which.

DETAILED DESCRIPTION OF THE INVENTION

Figure 1:
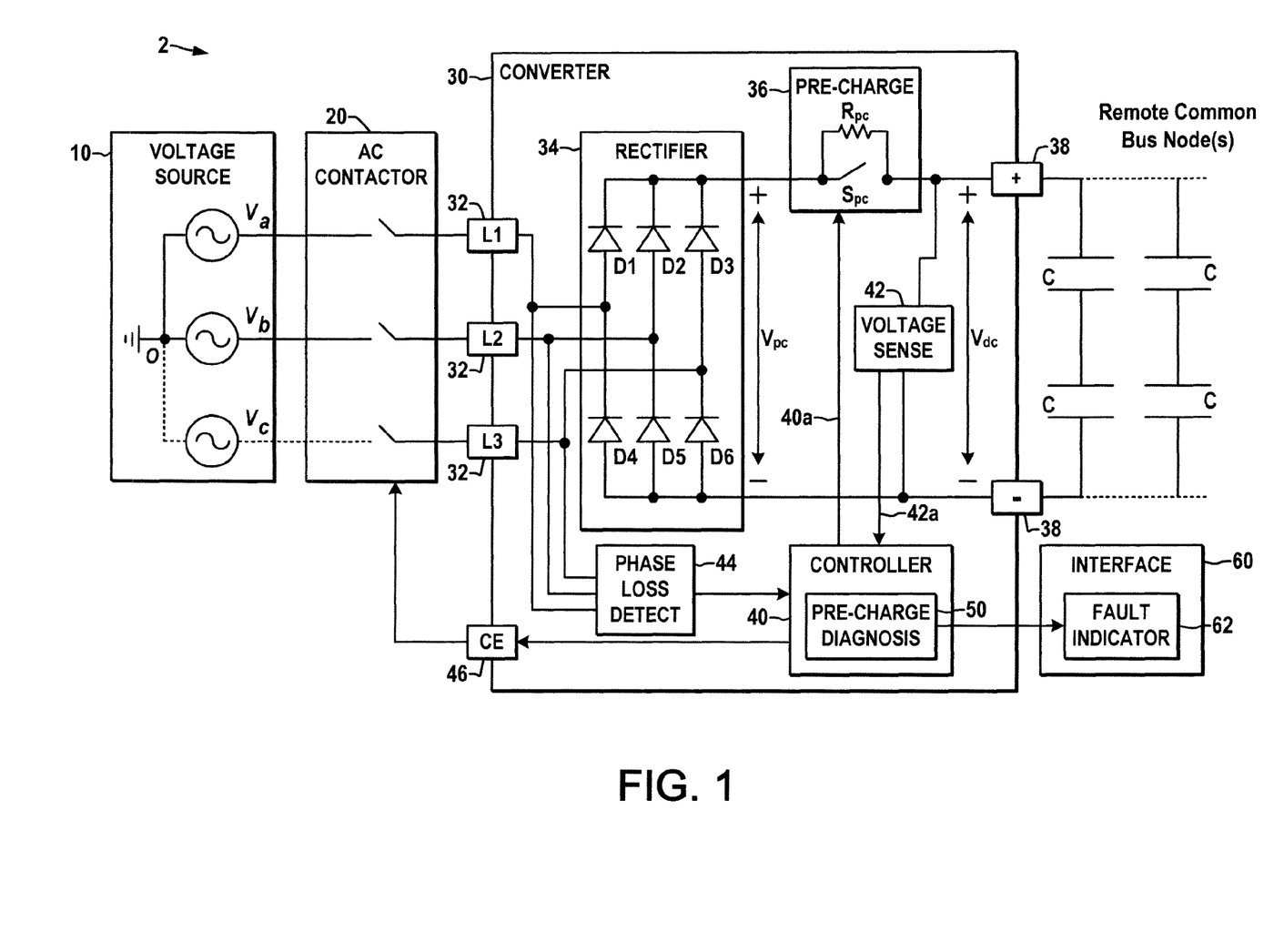
FIG. 1 is a schematic diagram illustrating an exemplary multiphase AC to DC power conversion system with pre-charge circuitry and a pre-charge diagnosis system in accordance with one or more aspects of the present disclosure.

Referring now to the figures, several embodiments or implementations of the present invention are hereinafter described in conjunction with the drawings, wherein like reference numerals are used to refer to like elements throughout, and wherein the various features are not necessarily drawn to scale. FIG. 1 shows an exemplary multiphase AC to DC power conversion system 2 with a pre-charge diagnosis system 50 in which various aspects of the present disclosure are implemented. While shown in the context of three-phase AC to DC conversion using a passive six-element rectifier 34, other embodiments are possible in which passive or active (e.g., switching) rectifiers are used, and in which single or multiphase AC is converted to DC for driving a load. Moreover, the presently disclosed concepts may be employed in connection with AC to DC converters 30 that provide DC outputs for driving any form of load, such as one or more inverters driving AC motor loads in one example. In this regard, the embodiments illustrated and described herein are merely exemplary and the present disclosure is not limited by or to the described implementations.

The power conversion system 2 includes an AC to DC converter 30 with an input 32 receiving power from an AC source 10 via a contactor 20 operable by a contactor enable (CE) signal 46 from the converter 30. The converter 30 provides a DC output 38 having positive and negative terminals forming an output bus to which a load is connected, in this case illustrated by one or more pairs of capacitors C to represent the capacitive loading of one or more motor drive inverters (not shown). It is noted that common DC bus configurations in which two or more loads are connected to the output 38 increase the chances of short circuit conditions, miswiring, or misapplication, whereby the disclosed pre-charge fault diagnostic techniques are particularly advantageous. The rectifier 34 is operatively coupled with the three input terminals 32 with six diodes D1-D6 forming a three-phase rectifier bridge to provide rectified DC current to plus and minus bus lines coupled with the output terminals 38. The rectifier 34 operates when the AC contactor 20 is closed (conducting) to convert the input AC power from the source 10 to provide DC electrical power at the output 38.

The positive DC bus terminal at the rectifier output is coupled to the positive output terminal 38 via a pre-charge circuit 36, which includes a resistor Rpc coupled between the rectifier 34 and the output 38, and a pre-charge switch Spc coupled between the rectifier 34 and the output 38. In this implementation, the resistor Rpc is connected in parallel with the switch Spc, and the switch is operable according to a pre-charge control signal 40a from a controller 40 to be placed in a first or open mode whereby current flows from the rectifier 34 to the positive output terminal 38 through the resistor Rpc, or in a second (closed) mode to bypass the resistor Rpc. Other pre-charge circuits 36 may be employed, having any number of switching devices and resistances, where the pre-charge switching device(s) Spc may be any form of mechanical, electromechanical, or electrical switching device, including without limitation relay, IGBT, etc. Moreover, while the illustrated pre-charge circuit 36 employs a parallel coupled resistance and switch combination, other interconnections are possible, wherein the presently disclosed concepts are not limited to any particular configuration of pre-charge circuit configurations.

A feedback system is provided, including a voltage sense component 42 that measures a DC voltage associated with the output 38 (e.g., either the voltage Vpc across the rectifier output (upstream of the Pre-charge circuit 36) or the voltage Vdc across the converter output terminals 38). The feedback system 42 provides a feedback signal 42a which is indicative of the measured DC voltage. The converter 30 also includes a controller 40 that receives the feedback signal 42a and provides a pre-charge control signal 40a to the switching device Spc to selectively operate the pre-charge circuit 36 in a pre-charge mode with the switching device Spc operated in a first (open) mode during startup of the converter 30, and thereafter is switched to a second (closed) state during normal converter operation. The converter 30 further includes a phase loss detection circuit 44 that detects the voltages at the input terminals 32 and provides phase presence/loss information to the controller 40.

The converter 30 further comprises a pre-charge diagnosis system 50 that is operatively coupled with the controller 40, and may be integrated into the controller 40. The diagnosis system 50 selectively detects one or more converter faults based at least partially on the feedback signal 42a during startup. In the illustrated embodiment, this involves comparing the measured Vdc and/or voltage rate change values dv/dt determined therefrom with acceptance or tolerance ranges that are themselves determined by the diagnosis system 50. The system 50, moreover, is operative to selectively discontinue application of power to the input 32 by controlling the contactor enable signal 46 to place the converter 30 in a fault state based on detected faults. In addition, the exemplary system 2 includes an operator interface 60, which can be integrated into the converter 30 and/or which may be external thereto, and may be implemented in a separate computing system operatively coupled with the converter 30, e.g., via a wired or wireless network connection or other operative coupling. In this implementation, the pre-charge diagnosis system 50 provides a fault indicator 62 to the interface 60 to indicate a diagnosed fault type, including without limitation a fault in the pre-charge circuit 36, a short circuit in a DC bus connected to the output 38, and/or incorrect capacitance C connected to the output 38.

The exemplary pre-charge diagnosis system 50 performs generally in accordance with the method 100 shown in FIGS. 2A-2D below and may be implemented as a state machine 200 illustrated and described below in connection with FIG. 3. The controller 40 and the diagnosis system 50 may be any suitable hardware, software, firmware, logic, or combinations thereof that are adapted, programmed, or otherwise configured to implement the functions illustrated and described herein. The controller 40 and the diagnosis system 50, moreover, may be implemented, in whole or in part, as software components and may be implemented as a set of sub-components or objects including computer executable instructions and computer readable data executing on one or more hardware platforms such as one or more computers including one or more processors, data stores, memory, etc. The components 40 and 50 and sub components thereof may be executed on the same computer or in distributed fashion in two or more processing components that are operatively coupled with one another to provide the functionality and operation described herein.

In the illustrated implementations, the pre-charge diagnosis system 50 performs a separate fault detection operation in one or more of a plurality of diagnostic states 201-205 (FIGS. 3 and 4 below) during the converter startup, although not a strict requirement of the broader aspects of the disclosure. In operation of this embodiment, the feedback system 42 measures Vdc and provides the feedback signal 42a to the controller 40 in two or more of the diagnostic states 201-205, and the pre-charge diagnosis system 50 computes the rate of change (dv/dt) in the DC voltage in these states and selectively detects converter fault(s) based at least partially on the computed dv/dt and/or the measured Vdc during startup. In addition, the exemplary pre-charge diagnosis system 50 is operative to measure the initial DC voltage Vpp (FIG. 4) before power is applied to the input (e.g., before the contactor 20 is closed in FIG. 1), although not a strict requirement of the disclosure. The illustrated system 50 uses this and known or assumed values for the capacitance C coupled to the output 38, and the value of the pre-charge resistor Rpc to compute an expected range of DC voltages or DC voltage change rates dv/dt over time during startup. These expected ranges are then compared with measured Vdc or computed dv/dt value(s) to ascertain whether one or more converter faults are suspected in the pre-charge circuit 36 and/or elsewhere in the converter. In accordance with further aspects of the disclosure, the pre-charge diagnosis system 50 may also be operative to learn an expected startup behavior based on previous startup(s) and may thus use an expected range of DC voltages or DC voltage change rates dv/dt computed in the previous startup for fault detection.

In the illustrated implementation, a number of variables are updated by the diagnosis system 50 of the controller 40 at a sample rate high enough for real-time evaluation of the performance of the converter 30 in the startup period. These include the DC bus voltage Vdc sampled synchronously by the system 50, an expected DC bus voltage final steady state value Vdc ss derived from AC and known tolerances of electrical power installations, the enable control CE 46 for the contactor 20, which the controller 40 will enable after initialization and when the system is not in the faulted state, a phase loss detection status PL which is TRUE if all line phases present and FALSE if No phases present, a phase loss detection status PLph that is TRUE if 3 phases present and FALSE if 2 phases are present, an expected AC line voltage applied value 'AC' which in one embodiment is a configuration variable (e.g., pre-configured or customer entered) that is stored in non-volatile memory in the controller 40, a DC bus capacitance value Cb connected both locally and in distributed common bus nodes if applicable which can be an initialization variable (hard-coded, customer entered, or detected by communication to remote common bus nodes) and which is stored as an internal variable, and a pre-charge resistance value Rpc that is pre-configured and stored in the controller memory in one implementation.

Figure 2A:
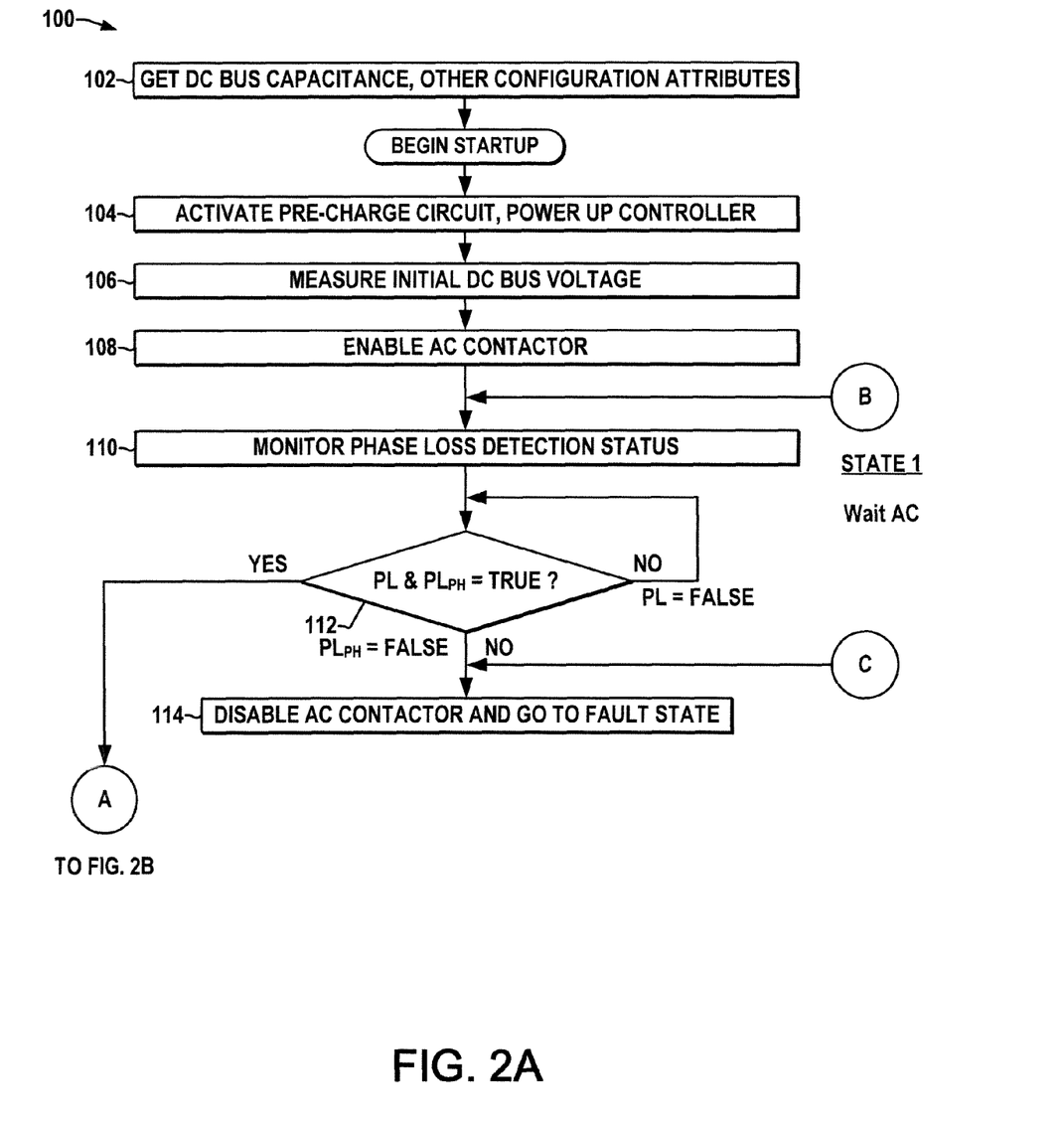
FIGS. 2A-2D are flow diagrams illustrating an exemplary method for diagnosing pre-charge faults in a power conversion system in accordance with further aspects of the present disclosure.
Figure 2B:
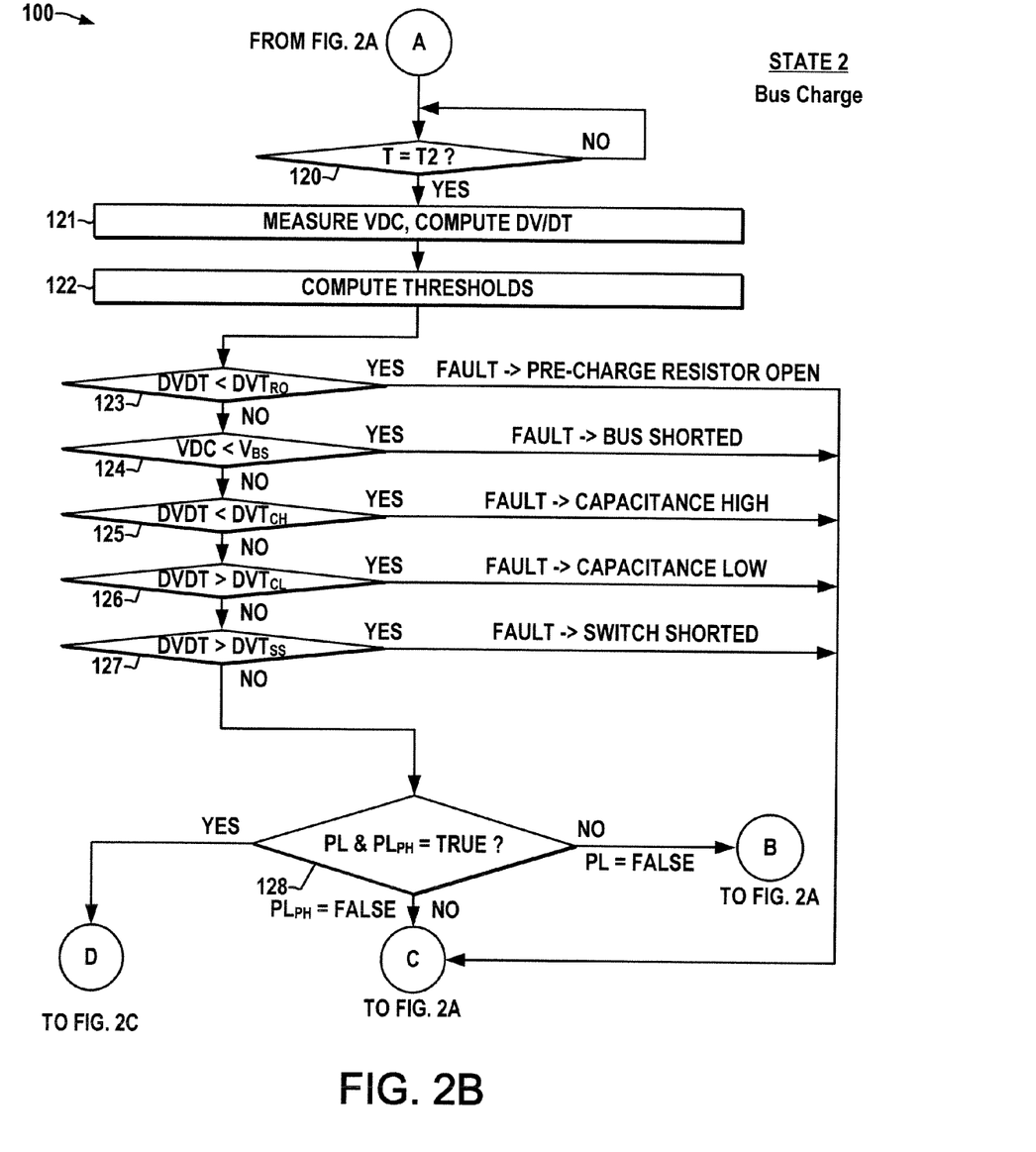
Figure 2C:
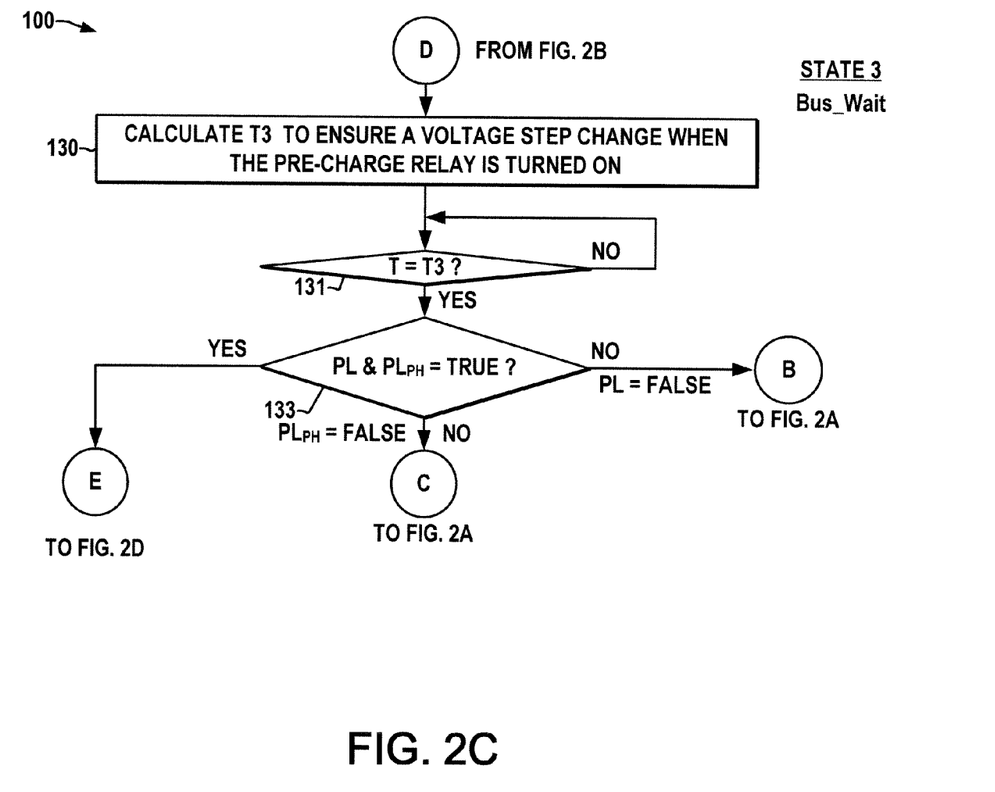
Figure 2D:
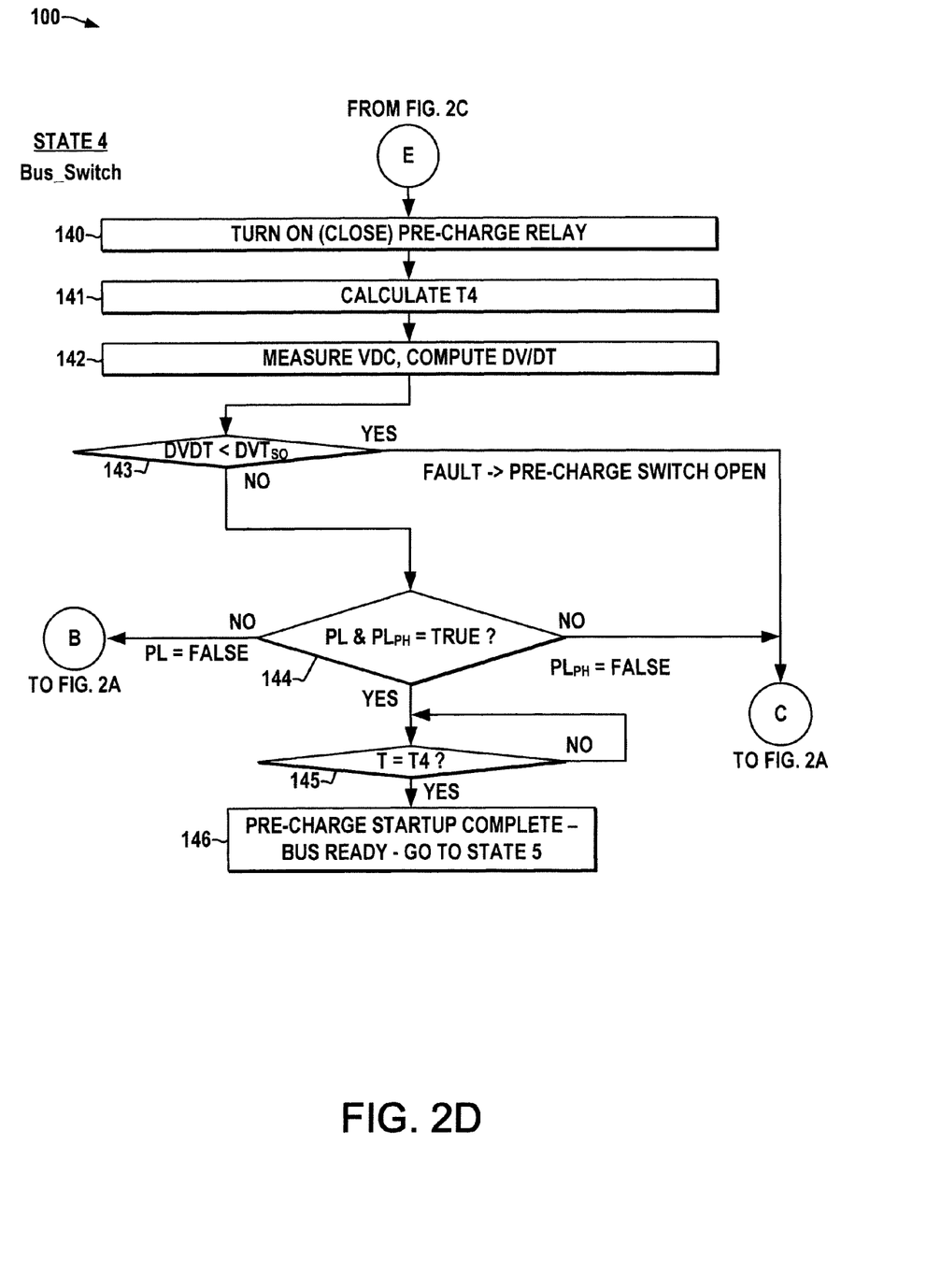
Figure 3:
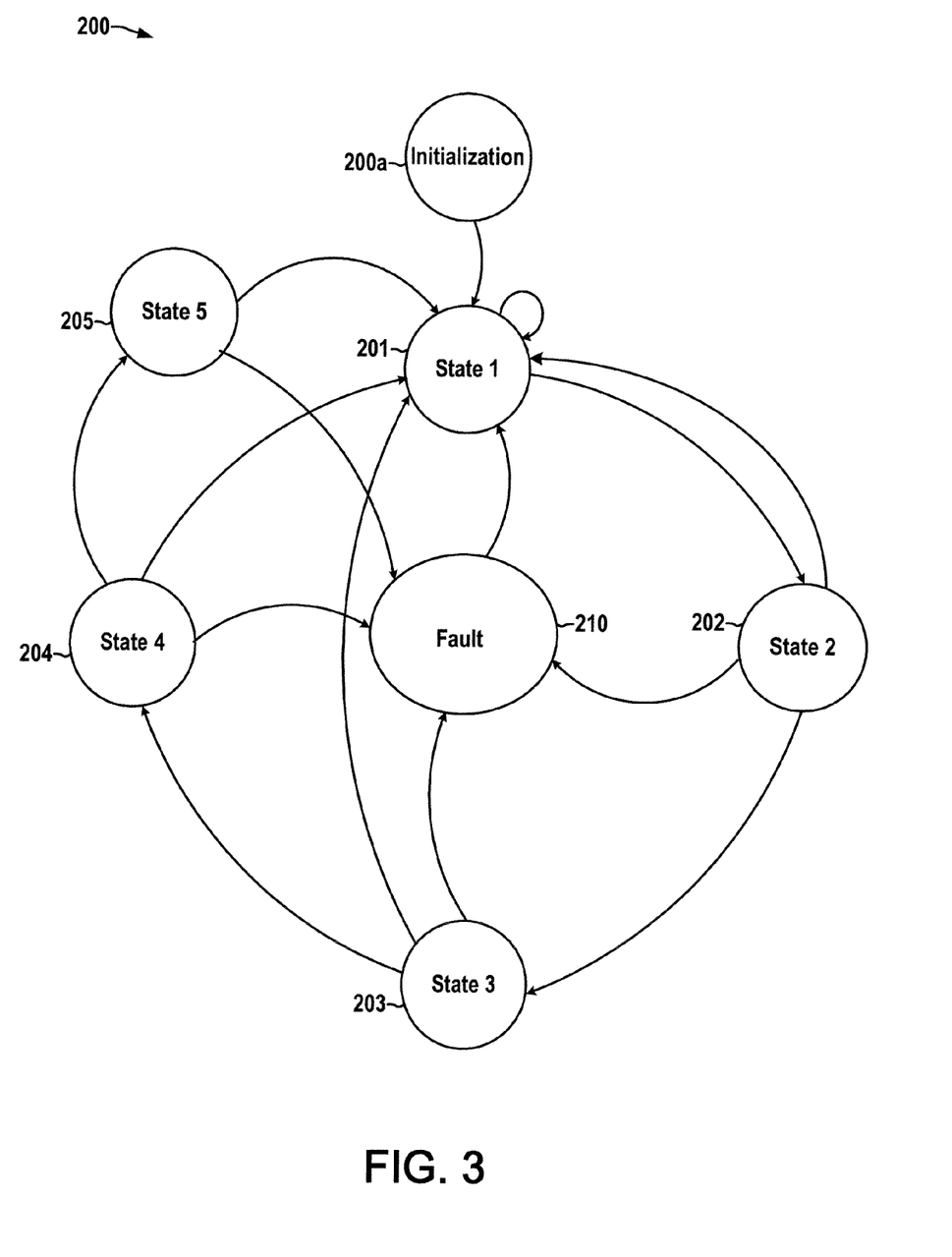
FIG. 3 is a state diagram further illustrating the method of FIGS. 2A-2D.
Figure 4:
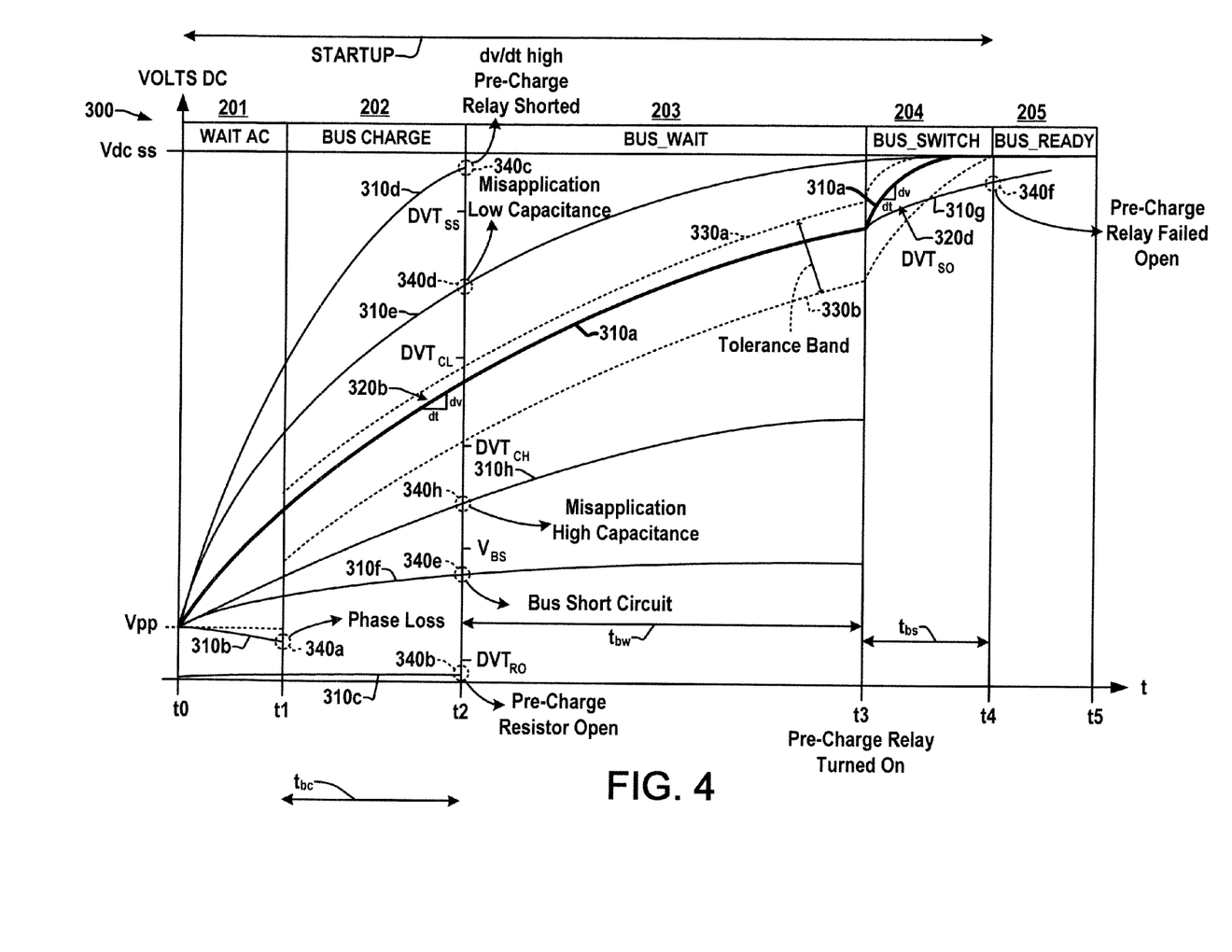
FIG. 4 is a graph illustrating various exemplary DC bus voltage curves and five exemplary states in the process of FIGS. 2A-3.

Referring also to FIGS. 2A-2D, 3, and 4, further aspects of the disclosure provide a method 100 (FIGS. 2A-2D) for controlling a power conversion system and for diagnosing faults during startup, further illustrated in the state diagram 200 of FIG. 3. The graph 300 in FIG. 4 depicts a number of exemplary voltage curves 310a-310h as a function of time during startup of the converter 30, as well as exemplary dv/dt measurements 320b and 320d during various states or stages of the startup, along with computed or previously learned tolerance bands 330a and 330b used in detecting faults during converter startup, and exemplary fault detection points 340a-340h. Although the exemplary method 100 is illustrated in FIGS. 2A-2D and described below in the form of a series of acts or events, it will be appreciated that the various methods of the disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated method 100 other methods of the disclosure may be implemented in hardware, software, or combinations thereof, such as in the exemplary pre-charge diagnosis system 50 in FIG. 1 above, and may be embodied in the form of computer executable instructions stored in a computer readable medium, such as in a memory operatively associated with the controller 40 and/or the diagnosis system 50 in one example.

The method 100 begins at 102 in FIG. 2A in an initialization state (state 200a in FIG. 3), where the diagnosis system 50 obtains the known or expected bus capacitance and other configuration attributes, and where the exemplary controller 40 will not enable the AC contactor 20 until the pre-charge attributes are known (if not in learning mode). The purpose of the initialization state 200a is to boot up the controller 40 and the system 50 and collect all relevant pre-charge monitoring variables (e.g., AC, Cb, and Rpc), and in which DC bus voltage sampling is active. The state 200a is entered when the initial controller is powered on (independently of the contactor 20) and the controller booting process is complete, and the state 200a is exited to a "Wait AC" state (state 2 202 in FIG. 3) after a successful boot and peripheral circuit test. The controller 40 and the diagnosis system 50 are powered up at 104 in FIG. 2A via separate power supply (not shown) in the initialization state 200a, and the pre-charge circuit 36 is activated by the controller 40 to open the switching device Spc. The configuration attributes/parameters in one example may be obtained at 102 from a communications link between the controller 40 and one or more inverter-type motor drive output stages (not shown) coupled with the output 38 of the converter 30, or such information may be preconfigured in the controller 40 or may otherwise be obtained by user prompting (e.g., via the interface 60 in FIG. 1), or through a network connection to another control device (not shown). Alternate methods to obtain total capacitance information include user-supplied configuration information, an auto-tune function, or a learning function where the controller 40 can measure the connected capacitance. At 106, the feedback system 42 measures the bus voltage and provides this to the diagnosis system 50 as the initial state Vpp (FIG. 4) prior to activation of the contactor 20.

To enter the Wait AC state 1, the diagnosis system 50 of the controller 40 enables the contactor 20 at 108 (via the CE enable signal 46). The first state is depicted as state 201 in the state diagram 200 of FIG. 3, and the initial state 201 shown in the graph 300 of FIG. 4. The purpose of this state 201 is to determine if AC line voltage has been applied or not, and the state 201 is entered from the initialization state 200a, a fault state 210 (e.g., if an operator executes a fault reset command), or from a fifth BUS_READY state 205 (e.g., Phases are removed PL=FALSE). At 110, the status of the phase loss detection system 44 (PL, $PL_{PH}$) is monitored. A determination is made at 112 as to whether both PL and $PL_{PH}$ are TRUE. If so (YES at 112), the process 100 proceeds to a BUS CHARGE state (state 2) 202 in FIG. 2B as described below. If not (NO at 112) and if the PL status value is FALSE (indicating no input phases are present), the phase loss monitoring continues at 112. If $PL_{PH}$ is FALSE (indicating only two of three phases are present in the illustrated three-phase system above), the process 100 proceeds to a faulted state at 114 (fault state 210 in FIG. 3). This condition is shown in the exemplary voltage curve 310b in FIG. 4 where the voltage Vdc is at or near zero at point 340a at or near time T1 indicating phase loss fault condition. A fault indicator is constructed by the diagnosis system 50 indicating that a phase has been lost and the system 50 disables the contactor 20 and transitions the converter 30 to the faulted state at 114 (fault state 210 in FIG. 3).

If the PL and PLPH values are both TRUE (YES at 112 in FIG. 2A), the process 100 proceeds to the BUS CHARGE state (state 2 202 in FIGS. 3 and 4) at 120 in FIG. 2A. Purpose of the state 202 is to detect pre-charge fault conditions, and if a fault is detected so that the contactor can be disabled to minimize stress to the system. A timer is established for ascertaining wither the time t2 has been reached, which in FIG. 4 is the time t1 plus a time $t_{bc}$. In the illustrated implementation, $t_{bc}$ is pre-configured and stored in the controller memory to a value that is sufficiently small to derive an accurate $dv/dt_{bc}$ value during the second state 202. For a 400V system, in one example, a $t_{bc}$ necessary for a DC bus voltage or pre-charge voltage value of 100V is sufficient. A determination is made at 120 as to whether the time t2 has been reached, and if so (YES at 120), the DC voltage is measured and the change rate dv/dt is computed at 121 (dv/dt measurement 320b in FIG. 4). This computed rate $dv/dt_{bc}$ and the measured Vdc are then compared in state 202 to various threshold values computed at 122 to identify suspected system fault conditions at 123-127 (thresholds shown in FIG. 4). In particular, if the rate of change value is sufficiently high, then either too little DC bus capacitance is connected or the pre-charge switch $S_{pc}$ is shorted, whereas if it is too low, then too much capacitance is connected in the system. A determination is made at 123 as to whether $dv/dt_{bc}$ is less than a threshold $DVT_{RO}$. In the illustrated embodiment, this threshold is a pre-configured value close to zero. If PL=TRUE and $dv/dt_{bc}$ is less than this threshold (YES at 123), then the pre-charge resistor Rpc is presumed to be failed in an open-circuited condition. (RESISTOR OPEN FAULT). A fault indication is then set to indicate a PRE-CHARGE RESISTOR OPEN fault since the phases are present but the bus voltage did not rise (or dropped) as shown by the curve 310c at measurement 340b in FIG. 4. In this case, the converter is taken to the fault state at 114 (state 210 in FIG. 3).

Otherwise (NO at 123, and if PL and $PL_{PH}$ are TRUE), a determination is made at 124 as to whether the bus voltage Vdc is less than a preset bus short threshold value $V_{BS}$. If so (YES at 124), a fault indication is then set to indicate a PRE-CHARGE RESISTOR OPEN fault and the converter is taken to the fault state at 114 (state 210 in FIG. 3). This condition is shown in the exemplary voltage curve 310f in FIG. 4 where the voltage Vdc is non-zero but below $V_{BS}$ at point 340e at or near time t2, indicating that the DC bus is shorted or that a bus capacitor is near failure (e.g., dry up, electrolyte failure, etc.).

Otherwise (NO at 124, and if PL and $PL_{PH}$ remain TRUE), a determination is made at 125 as to whether $dv/dt_{bc}$ is less than a threshold $DVT_{CH}$. If so (YES at 125), a fault indication is then set to indicate a CAPACITANCE HIGH fault and the converter is taken to the fault state at 114 (state 210 in FIG. 3). This condition is shown in the exemplary voltage curve 310h in FIG. 4 at point 340e at or near time t2, indicating that the total amount of DC bus capacitance is higher than expected.

Otherwise (NO at 125, and if PL and $PL_{PH}$ remain TRUE), a determination is made at 126 as to whether $dv/dt_{bc}$ is greater than a threshold $DVT_{CL}$. If so (YES at 126), a fault indication is then set to indicate a CAPACITANCE LOW fault and the converter is taken to the fault state at 114 (state 210 in FIG. 3). This condition is shown in the exemplary voltage curve 310e in FIG. 4 at point 340d at or near time t2, indicating that the total amount of DC bus capacitance is less than expected. This may involve a remote common bus node that is not connected to the output 38 of the converter 30, and as a result, the bus voltage rises slower than expected.

Otherwise (NO at 126, and if PL and $PL_{PH}$ remain TRUE), a determination is made at 127 as to whether $dv/dt_{bc}$ is greater than a short circuit threshold $DVT_{SS}$. If this threshold is exceeded (YES at 127), the diagnosis system 50 presumes that the pre-charge switch Spc is shorted, such as if the pre-charge switch (relay or IGBT) is failed closed and will not open. In this case, a fault indication is then set to indicate a SWITCH SHORTED fault and the converter 30 is taken to the fault state at 114 (state 210 in FIG. 3). This condition is shown in the exemplary voltage curve 310d in FIG. 4 at point 340c at or near time t2.

Otherwise (NO at 127), the status of PL and PL$_{PH}$ are again checked at 128, and if both remain TRUE (YES at 128), the process 100 proceeds to the third (BUS_WAIT) state 203 in FIG. 2C as described below. Otherwise, if PL is FALSE, the process returns to the Wait AC state 201 at 110 in FIG. 2A, or if PL$_{PH}$ is FALSE, the converter 30 is taken to the fault state 210 at 114 in FIG. 2A.

The purpose of the BUS_WAIT state 203 in FIG. 2C is to wait an appropriate amount of time so that when the pre-charge switch Spc is closed, an acceptable rate of change of bus voltage will occur. At 130 in FIG. 2C, the time out value t3 for state 3 is calculated by the system 50 so as to ensure that when the pre-charge switching device Spc has turned on (closed condition), a step change will occur in the DC bus voltage Vdc. This is desired so as to allow differentiation in state 4 (204) between the open and closed states of the switch Spc, and thereby to allow detection of possible 'failed-open' fault in the switch Spc. This is computed as a time $t_{bw}$ starting at t2, which is calculated at 130 in the illustrated embodiment based on criteria to wait the appropriate amount the time such that when the pre-charge switch is closed, only a small dv/dt is detectable by the system 50, where $t_{bw}$ can be calculated in one possible implementation based on variables AC, Rpc, Cb, Vdc ss, and associated tolerances known for these variables. A determination is made at 131 in FIG. 2C as to whether t3 has been reached, and if so (YES at 131), a determination is made at 133 as to whether PL and PL$_{PH}$ are both TRUE. If so, (YES at 133), the process 100 proceeds to the fourth (BUS_S-WITCH) state 204 in FIG. 2D as described below. Otherwise, if PL is FALSE, the process returns to the Wait AC state 201 at 110 in FIG. 2A, or if PL$_{PH}$ is FALSE, the converter 30 is taken to the fault state 210 at 114 in FIG. 2A.

In the BUS_SWITCH state (state 204 in FIGS. 3 and 4) at 140 in FIG. 2D. At 140 in FIG. 2D, the pre-charge switch Spc is closed and a time out value t4 for state 4 is calculated by the system 30 at 141. In this example, a time $t_{BS}$ is computed, beginning at time t3, based on the expected steady state DC bus voltage Vdc ss and the cumulative sum of previous state times. At 142, the bus voltage Vdc is measured and a change rate $dv/dt_{bs}$ is calculated during the BUS_SWITCH state time $t_{ps}$. If the switch Spc is operational, this results in a fast voltage rise as shown in the ideal curve 310a in state 204 in FIG. 4. To assess this, the voltage Vdc is measured and the dv/dt is calculated at 142 and a determination is made at 143 as to whether the calculated state 4 dv/dt is less than a predetermined threshold value DVT$_{SO}$. If so (YES at 143), a fault indication is generated indicating that the pre-charge switch Spc has failed in the open state. An example is shown at curve 310g at point 340f in FIG. 4, where the diagnosis system 50 assumes that the switch Spc has not closed (SWITCH OPEN fault). The process in this case goes to the fault state with the contactor 20 being disabled at 114 in FIG. 2A. Otherwise, (NO at 143), a determination is made at 144 as to whether PL and PL$_{PH}$ are both TRUE. If so, (YES at 144), the process 100 waits for T4 to occur (YES at 145), whereupon the system 50 presumes that the pre-charge switching device Spc is functioning properly in the closed mode and the startup is completed at 146 for subsequent normal converter operation in state 5. In state 5 (state 205 in FIGS. 3 and 4), the DC bus is at its steady state value (Vdc ss in FIG. 4) and is ready for use for the desired application. If phases are subsequently lost and/or the DC bus has decayed by a pre-defined percentage, the state machine 200 in the diagnosis system 50 transitions the converter 30 back to state 1. If an input phase problem is detected (NO at 144), the process 100 proceeds to either the fault state 114 (if PL$_{PH}$ is FALSE) or to the Wait AC state at 110 (if PL is FALSE).

The disclosed apparatus and methods thus employ the specific characteristics of the measured Vdc at specific intervals or states of the pre-charge (startup) cycle in the converter 30. In the illustrated embodiment, each state 201-205 of the state machine 200 in FIG. 3 computes a corresponding state time-out period T1-T5, respectively, and when this has elapsed, the current DC bus voltage is measured via the feedback component 42 and a dv/dt calculation is performed in the diagnosis system 50 (e.g., ΔVolts/ΔT where ΔT is the time out period). These values are analyzed to determine the transition to the next state. The time out period in one possible implementation is calculated by each state utilizing one or more of: Current DC bus value, Total capacitance; Pre-charge resistance value; Product requirement of AC input voltage range (i.e. 460V +/−10%); Single or three phase connection (based on phase loss circuit status or other means); Whether the down stream common bus nodes have their own pre-charge; and the initial voltage Vpp latched in state 1. In certain implementations, moreover, the time out values are always sufficiently long so that charging cycles of the AC line do not affect the resulting dv/dt calculation. For example, charging cycles of the rectifier 34 could have short term negative dv/dt values, and such short term negative dv/dt affects could also be minimized using digital filtering.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, logic, or combinations thereof, which performs the specified function of the described component (i.e., that is functionally equivalent), even though not structurally equivalent to the disclosed structure which performs the function in the illustrated implementations of the invention. Moreover, the various control components may be implemented as computer-executable instructions for carrying out one or more of the above illustrated and described control operations, steps, tasks, where the instructions are included in a computer-readable medium. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

Having thus described the invention, the following is claimed:

1. A power converter, comprising:
an input to receive AC electrical input power;
an output to provide DC electrical output power;
a rectifier operatively coupled with the input and the output and operative to convert the input power to provide DC electrical power at the output;
a pre-charge circuit, comprising:
  a resistor coupled between the rectifier and the output, and
  a switching device coupled between the rectifier and the output and being operable in a first mode to allow current to flow from the rectifier to the output through the resistor and in a second mode to bypass the resistor;

a feedback system operative to measure a DC voltage associated with the output and to provide a feedback signal indicative of the measured DC voltage; and a controller receiving the feedback signal from the feedback system and providing a pre-charge control signal to the switching device to selectively operate the pre-charge circuit in a pre-charge mode with the switching device operated in a first mode during startup of the converter; and a pre-charge diagnosis system operatively coupled with the controller to selectively detect at least one converter fault based at least partially on the feedback signal during startup and to selectively discontinue application of power to the input and place the converter in a fault state based on detected faults.

2. The power converter of claim 1, wherein the pre-charge diagnosis system provides a fault indicator to an interface associated with the converter to indicate a diagnosed fault type.

3. The power converter of claim 1, wherein the rectifier is a passive rectifier including at least one diode.

4. The power converter of claim 1, wherein the pre-charge diagnosis system performs a separate fault detection operation in each of a plurality of different time periods during startup.

5. The power converter of claim 1, wherein the feedback system measures the DC voltage and provides the feedback signal to the controller in two or more different time periods during startup, and wherein the pre-charge diagnosis system computes a rate of change in the DC voltage in the two or more time periods and selectively detects the at least one converter fault based at least partially on the computed rates of change during startup.

6. The power converter of claim 1, wherein the pre-charge diagnosis system is operative to measure an initial DC voltage before power is applied to the input, to again measure the DC voltage, to compute an expected range of DC voltages or DC voltage change rates over time during startup using the initial DC voltage and known or assumed values for output capacitance coupled to the output, and the resistor, and to selectively detect the at least one converter fault based at least partially on the feedback signal and the expected range of DC voltages or DC voltage change rates.

7. The power converter of claim 6, wherein the pre-charge diagnosis system is operative to use an expected range of DC voltages or DC voltage change rates computed in a previous startup.

8. The power converter of claim 1, wherein the at least one converter fault is a fault in the pre-charge circuit.

9. The power converter of claim 1, wherein the at least one converter fault is a short circuit in a DC bus connected to the output.

10. The power converter of claim 1, wherein the at least one converter fault is incorrect capacitance connected to the output.

11. A method for detecting power converter faults during startup, the method comprising;

activating a pre-charge circuit connected to an output of a rectifier;

measuring an initial converter DC voltage;

determining an expected range of DC voltages or DC voltage change rates based at least partially on the initial converter DC voltage;

applying AC electrical input power to the rectifier;

again measuring the converter DC voltage after application of the input power during startup of the converter; and determining whether a fault is suspected in the converter during startup based at least partially on the measured DC voltage.

12. The method of claim 11, further comprising, if a fault is suspected, selectively discontinuing application of input power to the rectifier and placing the converter in a fault state.

13. The method of claim 11, further comprising indicating a diagnosed fault type via an interface associated with the converter.

14. The method of claim 11, further comprising performing a separate fault detection operation in each of a plurality of different time periods during startup.

15. The method of claim 11, further comprising computing a rate of change in the DC voltage in two or more different time periods during startup and determining whether a fault is suspected based at least partially on the computed rates of change.

16. The method of claim 11, further comprising:

computing an expected range of DC voltages or DC voltage change rates over time during startup using the initial DC voltage and known or assumed values for an output capacitance coupled to the converter, and a resistance of the pre-charge circuit; and determining whether a fault is suspected based at least partially on the measured DC voltage and the expected range of DC voltages or DC voltage change rates.

17. The method of claim 11, further comprising determining whether a fault is suspected based at least partially on the measured DC voltage and an expected range of DC voltages or DC voltage change rates computed in a previous startup.

18. A computer readable medium having computer executable instructions for performing the steps of:

activating a pre-charge circuit connected to an output of a rectifier;

measuring an initial converter DC voltage;

determining an expected range of DC voltages or DC voltage change rates based at least partially on the initial converter DC voltage;

applying AC electrical input power to the rectifier;

again measuring the converter DC voltage after application of the input power during startup of the converter; and determining whether a fault is suspected in the converter during startup based at least partially on the measured DC voltage.

19. The power converter of claim 8, wherein the at least one converter fault is a switching device short circuit fault.

20. The power converter of claim 8, wherein the at least one converter fault is a switching device open circuit fault.

21. The power converter of claim 8, wherein the at least one converter fault is a resistor open circuit fault.

22. The power converter of claim 1, wherein the at least one converter fault is a phase loss fault.

* * * * *